(12) United States Patent
Chen et al.

(10) Patent No.: US 7,619,535 B2
(45) Date of Patent: Nov. 17, 2009

(54) POWER MONITORING APPARATUS OF FAN

(75) Inventors: Chien-Hua Chen, Taoyuan Hsien (TW);
Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 452 days.

(21) Appl. No.: 11/481,051

(22) Filed: Jul. 6, 2006

(65) Prior Publication Data

US 2007/0018838 A1 Jan. 25, 2007

(30) Foreign Application Priority Data

Jul. 22, 2005 (TW) ................ 94124968 A

(51) Int. Cl.
*G08B 21/00* (2006.01)
(52) U.S. Cl. ............... 340/635; 340/661; 340/693.4; 361/18
(58) Field of Classification Search ............ 340/635, 340/661, 693.4; 361/18
See application file for complete search history.

(56) References Cited

U.S. PATENT DOCUMENTS

| 5,465,188 | A | * | 11/1995 | Pryor et al. ............... 361/18 |
| 5,469,320 | A | * | 11/1995 | Walker et al. .............. 361/33 |
| 5,534,854 | A | * | 7/1996 | Bradbury et al. .......... 340/648 |
| 5,861,736 | A | * | 1/1999 | Corsi et al. ............... 323/273 |
| 5,877,604 | A | * | 3/1999 | Kessler ..................... 318/447 |
| 5,880,678 | A | * | 3/1999 | Yu ........................... 340/671 |
| 5,946,177 | A | * | 8/1999 | Miller et al. ............... 361/56 |
| 6,114,678 | A | * | 9/2000 | Lee .......................... 219/716 |
| 6,163,266 | A | * | 12/2000 | Fasullo et al. ............. 340/664 |
| 6,674,624 | B2 | * | 1/2004 | Matsuura ................... 361/115 |
| 6,735,706 | B2 | * | 5/2004 | Tomlinson et al. ......... 713/300 |
| 6,933,769 | B2 | * | 8/2005 | Koelling .................... 327/538 |
| 6,940,416 | B2 | * | 9/2005 | Hudson et al. ............. 340/663 |
| 6,997,684 | B2 | * | 2/2006 | Hahn et al. ................ 417/44.1 |
| 2002/0093250 | A1 | * | 7/2002 | Yu ........................... 307/117 |
| 2002/0109535 | A1 | * | 8/2002 | Caliboso ................... 327/143 |
| 2002/0181250 | A1 | * | 12/2002 | Riggio et al. ............... 363/16 |
| 2004/0036619 | A1 | * | 2/2004 | Berst et al. ................ 340/635 |
| 2006/0113927 | A1 | * | 6/2006 | Bondy et al. ............... 315/307 |
| 2007/0110558 | A1 | * | 5/2007 | Chen et al. ................ 415/47 |
| 2007/0116577 | A1 | * | 5/2007 | Chen et al. ................ 417/7 |
| 2007/0258805 | A1 | * | 11/2007 | Liu et al. ................... 415/47 |

* cited by examiner

*Primary Examiner*—Daniel Wu
*Assistant Examiner*—Bradley E Thompson
(74) *Attorney, Agent, or Firm*—Birch, Stewart, Kolasch & Birch, LLP

(57) ABSTRACT

A power monitoring apparatus of a fan is for receiving an input voltage from external. The power monitoring apparatus includes a starting unit and a voltage detecting unit. The starting unit receives the input voltage and starts the fan according to the input voltage. The voltage detecting unit is electrically connected to the starting unit and generates a warning signal when the input voltage is not equal to a reference value.

20 Claims, 5 Drawing Sheets

180; # POWER MONITORING APPARATUS OF FAN

This Non-provisional application claims priority under U.S.C.§ 119(a) on Patent Application No(s). 094124968, filed in Taiwan, Republic of China on Jul. 22, 2006, the entire contents of which are hereby incorporated by reference.

BACKGROUND OF THE INVENTION

1. Field of Invention

The present invention relates to a power monitoring apparatus, and more particularly to a power monitoring apparatus applied to a fan.

2. Related Art

Generally, at least one fan is used to an electronic system for thermal dissipation so as to maintain the electronic system in a normal operating condition. The power of the fan is provided by the electronic system directly or by an external voltage source indirectly. However, if the input voltage generated by the electronic system or the voltage source is abnormal, for example the input voltage is too high or too low, the internal elements of the fan may be damaged. For example, an over current phenomenon is formed when the input voltage is too low and the current rises, and the internal elements of the fan may be damaged. On the contrary, when the input voltage is too high and over the acceptable voltage of the fan, the internal elements of the fan may also be damaged. Typically, an analog control chip is used to perform the voltage detection.

As shown in FIG. 1, a conventional power monitoring apparatus 1 receives an input voltage 91 from exterior as the power source of a fan 10. Firstly, the input voltage 91 is detected by an analog control chip 11. A starting unit 12 of the power monitoring apparatus 1 switches on the fan 10 when the input voltage 91 is normal. On the other hand, the analog control chip 11 switches off the starting unit 12 and stops the operation of the fan 10 when the input voltage 91 is lower than the minimum starting voltage or is higher than the maximum acceptable voltage. It only prevents the internal elements of the fan from being damaged to achieve a voltage protection, but the fan 10 can still be operated when the input voltage 91 is not lower than the minimum starting voltage or is not higher than the maximum acceptable voltage. The abnormal input voltage 91 of the fan 10 is not highlighted, which is possible to lead to an unexpected operation and affects the reliability of the fan 10.

Therefore, it is imperative to provide a power monitoring apparatus to solve the above-mentioned problems.

SUMMARY OF THE INVENTION

In view of the foregoing, the present invention provides a power monitoring apparatus of a fan capable of outputting a warning signal when an input voltage is abnormal. Thus, the abnormal input voltage of the fan is highlighted for facilitating to perform repair.

To achieve the above, a power monitoring apparatus of a fan according to the present invention is provided. The power monitoring apparatus is for receiving an input voltage from exterior and includes a starting unit and a voltage detecting unit. The starting unit receives the input voltage and starts the fan according to the input voltage. The voltage detecting unit is electrically connected to the starting unit and generates a warning signal when the input voltage is not equal to a reference value.

To achieve another aspects, the present invention provides a power monitoring apparatus of a fan, which is capable of turning off the fan to achieve voltage protection when the input voltage is lower than the minimum starting voltage or is higher than the maximum acceptable voltage.

To achieve the above, another power monitoring apparatus of a fan according to the present invention is provided. The power monitoring apparatus is for receiving an input voltage from exterior and includes a starting unit, a voltage detecting unit and a voltage monitoring unit. The starting unit receives the input voltage and starts the fan according to the input voltage. The voltage detecting unit is electrically connected to the starting unit and generates a warning signal when the input voltage is not equal to a first reference value. The voltage monitoring unit receives the input voltage and is electrically connected to the starting unit. The voltage monitoring unit turns off the starting unit when the input voltage is not equal to a second reference value.

As mentioned above, a power monitoring apparatus of a fan according to the present invention utilizes the voltage detecting unit to detect whether the input voltage is abnormal, and outputs a warning signal according to the abnormal input voltage. Comparing with the prior art, the power monitoring apparatus of the present invention can highlight the abnormal input voltage of the fan for facilitating to perform repair. In addition, the power monitoring apparatus of the present invention can turn off the fan to achieve voltage protection when the input voltage is lower than the minimum starting voltage or is higher than the maximum acceptable voltage.

BRIEF DESCRIPTION OF THE DRAWINGS

The present invention will become more fully understood from the detailed description given herein below illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
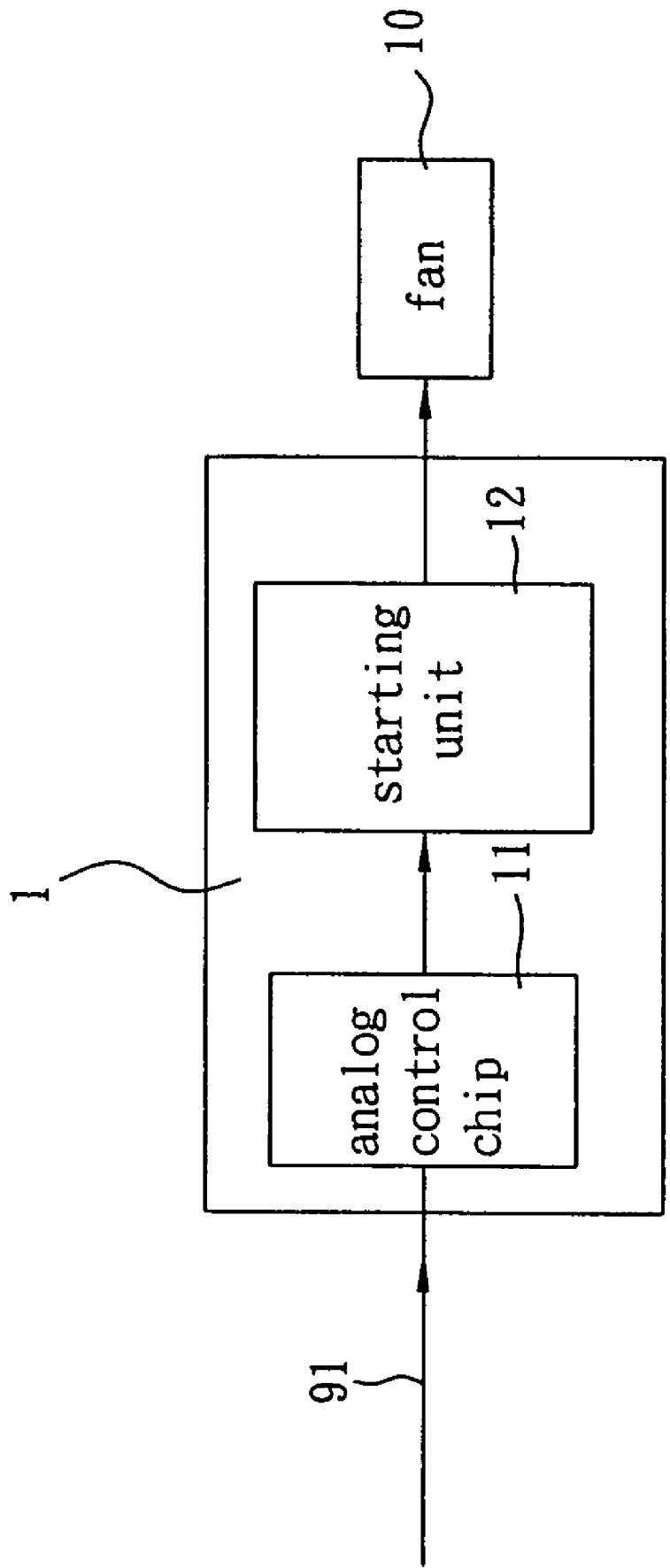
FIG. 1 is a block diagram showing a conventional power monitoring apparatus.
Figure 2:
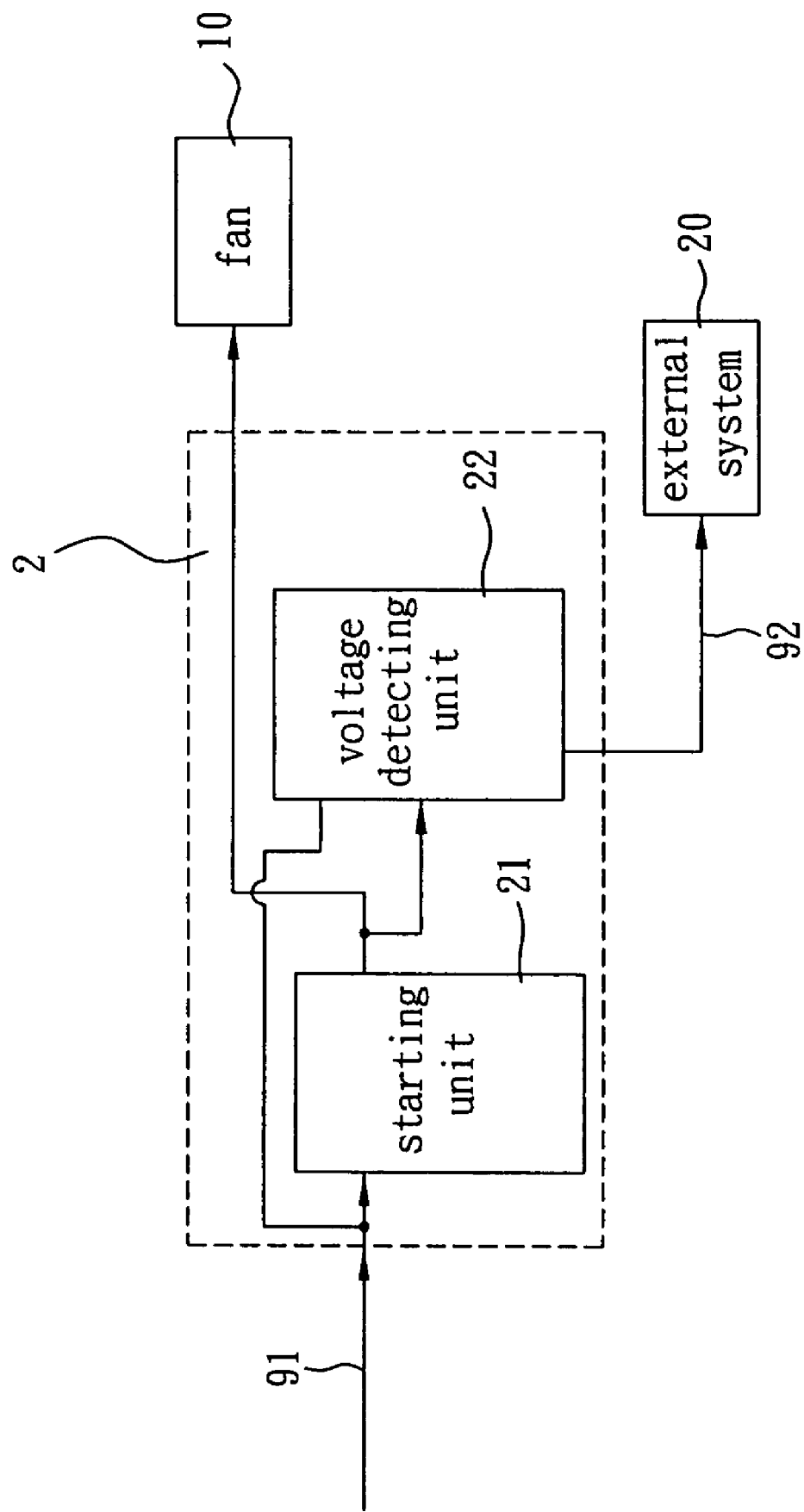
FIG. 2 is a block diagram showing a power monitoring apparatus according to a preferred embodiment of the present invention.
Figure 3:
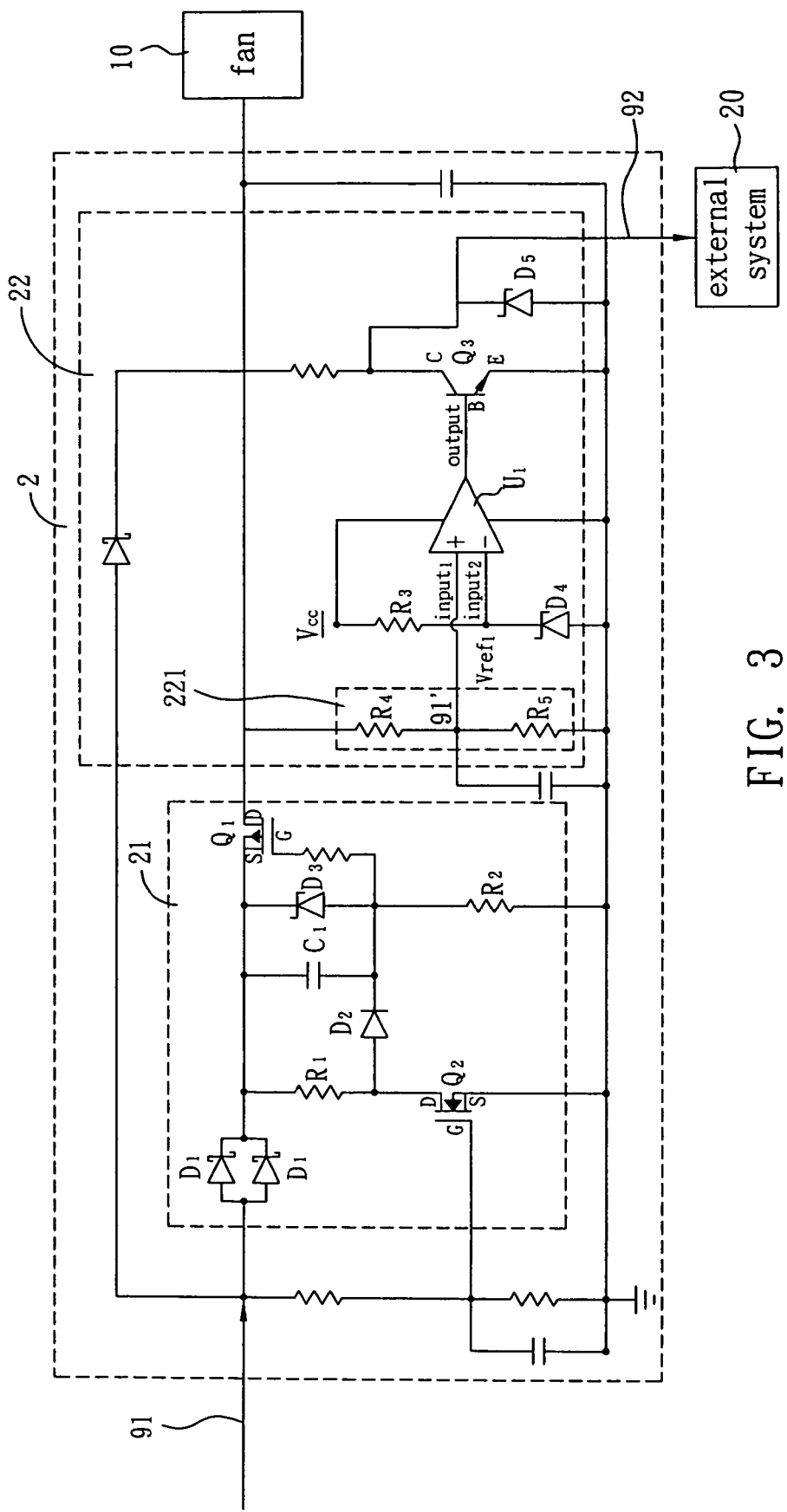
FIG. 3 is a circuit diagram showing a power monitoring apparatus according to the preferred embodiment of the present invention.

FIGS. 2 and 3 are a block diagram and a circuit diagram showing a power monitoring apparatus according to a preferred embodiment of the present invention, respectively. As shown in FIG. 2, a power monitoring apparatus 2 includes a starting unit 21 and a voltage detecting unit 22. The power monitoring apparatus 2 receives an input voltage 91 from exterior and cooperates with a fan 10 and an external system 20.

Herein, the input voltage 91 provides electrical energy to drive the subsequent circuits. The power monitoring apparatus 2 can output a warning signal 92 to the external system 20 when the input voltage 91 is abnormal. The external system 20 receives the warning signal 92 and replies to highlight the abnormal input voltage for facilitating to perform repair, for example, increasing or decreasing the voltage value of the input voltage 91. Herein, the external system 20 may be a computer system or a control apparatus. This embodiment is described herein below in condition of under-voltage.

As shown in FIG. 3, the starting unit 21 has two first diodes $D_1$, two resistors $R_1$ and $R_2$, a first switch element $Q_1$, a second switch element $Q_2$, a second diode $D_2$, a Zener diode $D_3$ and a capacitor $C_1$. The first switch element $Q_1$ and the second switch element $Q_2$ are transistors or other electrical devices having switching functions.

The first diodes $D_1$ are connected in parallel, and one end of each first diode $D_1$ receives the input voltage 91. In this embodiment, the first diodes $D_1$ may be Schottky diodes for avoiding a reverse current. One end of the resistor $R_1$ is electrically connected to the other end of each first diode $D_1$.

In this embodiment, the first switch element $Q_1$ is a PMOS transistor and the second switch element $Q_2$ is an NMOS transistor. The first switch element $Q_1$ has a source S electrically connected to the other end of each first diode $D_1$ so as to receive the input voltage 91, and a drain D electrically connected to the fan 10. The second switch element $Q_2$ has a drain D electrically connected to the other end of each first diode $D_1$ via the resistor $R_1$.

In addition, the drain D of the second switch element $Q_2$ is electrically connected to a gate G of the first switch element $Q_1$ via the second diode $D_2$ for controlling the first switch element $Q_1$. The Zener diode $D_3$ has one end electrically connected to the source S of the first switch element $Q_1$ and the other end electrically connected to the second diode $D_2$. The capacitor $C_1$ has one end electrically connected to the source S of the first switch element $Q_1$ and the other end electrically connected to one end of the resistor $R_2$. The other end of the resistor $R_2$ is electrically connected to ground.

When the starting unit 21 operates, the one end of each first diode $D_1$ receives the input voltage 91 such that the capacitor $C_1$ starts to be charged. When the voltage value of the capacitor $C_1$ reaches the starting voltage of the first switch element $Q_1$, the first switch element $Q_1$ is turned on to switch on the fan 10. In addition, the charging circuit composed of the capacitor $C_1$ and the resistor $R_2$ of this embodiment allows the current flowing through the fan 10 to be increased slowly so as to achieve a soft-start effect.

The voltage detecting unit 22 has a first comparator $U_1$, a third switch element $Q_3$, a resistor $R_3$, two Zener diodes $D_4$ and $D_5$, and a first voltage-dividing unit 221. The third switch element $Q_3$ can be a transistor or other electrical devices having switching functions.

The first voltage-dividing unit 221 has two resistors $R_4$ and $R_5$. The resistor $R_4$ has one end for receiving the input voltage 91 and the other end electrically connected to one end of the resistor $R_5$. The other end of the resistor $R_5$ is electrically connected to ground. Thus, a voltage-dividing circuit is formed for generating a voltage-divided input voltage 91'. Because the input voltage 91 may be a larger voltage, the voltage-divided input voltage 91' may have a lower voltage value to facilitate the subsequent operation after the input voltage 91 passes through the first voltage-dividing unit 221. The value of the voltage-divided input voltage 91' may be adjusted by adjusting the resistance ratio of the resistor $R_4$ to the resistor $R_5$ according to the practical requirements.

The first comparator $U_1$ has a first input terminal $input_1$ a second input terminal $input_2$ and an output terminal "output". The first input terminal $input_1$ is a positive input terminal which is electrically connected to the other end of the resistor $R_4$, and receives the voltage-divided input voltage 91'.

The resistor $R_3$ has one end electrically connected to an external voltage $V_{cc}$, and the other end electrically connected to one end of the Zener diode $D_4$. Herein, a first reference value $V_{ref1}$ is generated according to the constant voltage property of the Zener diode $D_4$. The voltage value of the first reference value $V_{ref1}$ may be determined according to the practical requirements and is not particularly restricted thereto.

The second input terminal $input_2$ is a negative input terminal which is electrically connected to the one end of the Zener diode $D_4$ and receives the first reference value $V_{ref1}$.

The third switch element $Q_3$ has a base B, a collector C and an emitter E. The base B is electrically connected to the output terminal "output". The collector C receives the input voltage 91 and the emitter E is electrically connected to ground. The Zener diode $D_5$ has one end which is electrically connected to the collector C and the other end which is electrically connected to ground.

The power monitoring apparatus 2 operates as follows. After the starting unit 21 receives the input voltage 91, the second switch element $Q_2$ and the first switch element $Q_1$ turn on and the fan 10 starts to operate. Herein, the first comparator $U_1$ compares the voltage-divided input voltage 91' with the first reference value $V_{ref1}$. When the voltage-divided input voltage 91' is higher than the first reference value $V_{ref1}$, the output terminal "output" outputs a positive voltage value to turn on the third switch element $Q_3$. The external system 20 receives a low-voltage signal and then the input voltage 91 is determined to be normal.

On the other hand, when the voltage-divided input voltage 91' is lower than the first reference value $V_{ref1}$, the output terminal "output" outputs a negative voltage value to turn off the third switch element $Q_3$. The external system 20 receives a high-voltage signal and then the input voltage 91 is determined to be abnormal. Thus, the external system 20 outputs the warning signal 92, such as noise or an image, according to the high-voltage signal to highlight the abnormal input voltage 91 of the fan 10.

The warning signal 92 is exemplary to be the high-voltage signal, and is not particularly restricted. The warning signal 92 may also be a low-voltage signal in accordance with the design of the external system 20. In addition, the first input terminal $input_1$ of the first comparator $U_1$ may also directly receive the input voltage 91 to perform the subsequent comparison operation, which is similar to that as described hereinabove and the description thereof will thus be omitted.

The first input terminal $input_1$ of the first comparator $U_1$ may also be a negative input terminal, and the second input terminal $input_2$ of the first comparator $U_1$ may also be a positive input terminal. Thus, the output terminal "output" outputs a negative voltage value when the voltage-divided input voltage 91' is higher than the first reference value $V_{ref1}$, such that the third switch element $Q_3$ is turned off. The external system 20 receives the high-voltage signal and then the input voltage 91 is determined to be abnormal. Thus, the external system 20 outputs the warning signal 92, such as noise or an image, according to the high-voltage signal to highlight the abnormal input voltage 91 of the fan 10.

Figure 4:
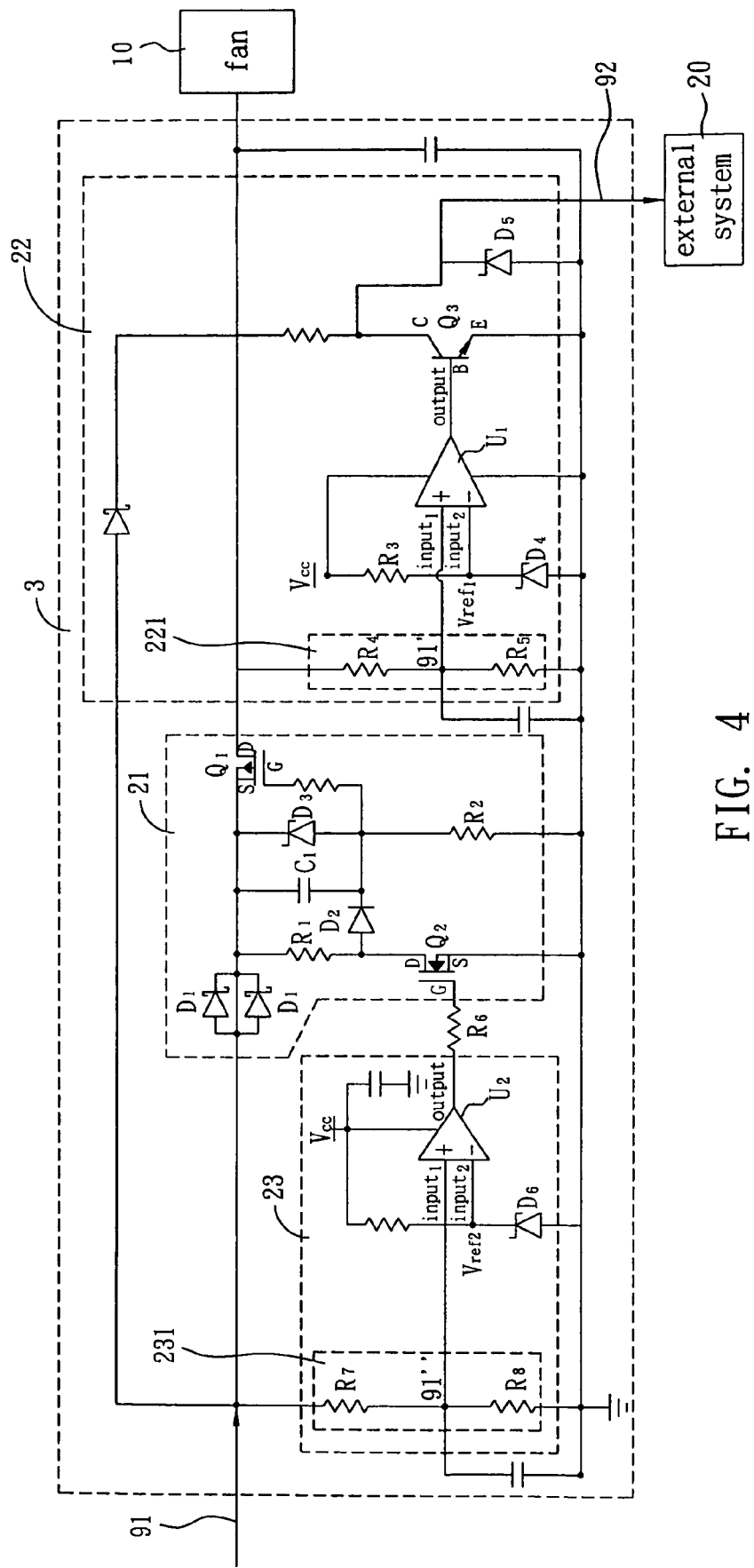
FIG. 4 is a circuit diagram showing another power monitoring apparatus according to the preferred embodiment of the present invention.

As shown in FIG. 4, a circuit diagram showing another power monitoring apparatus 3 according to the preferred embodiment of the present invention. The same references relate to the same elements and the description thereof will thus be omitted.

In this embodiment, the power monitoring apparatus 3 includes a starting unit 21, a voltage detecting unit 22 and a voltage monitoring unit 23. The voltage monitoring unit 23 has a second comparator $U_2$, a Zener diode $D_6$ and a second voltage-dividing unit 231.

The second voltage-dividing unit 231 has two resistors $R_7$ and $R_8$. The resistors $R_7$ has one end for receiving the input voltage 91 and the other end electrically connected to one end of the resistor $R_8$. The other end of the resistor $R_8$ is electrically connected to ground. Thus, a voltage-dividing circuit is formed for generating a voltage-divided input voltage 91". Because the input voltage 91 may be a larger voltage, the voltage-divided input voltage 91" may have a lower voltage value to facilitate the subsequent operation after the input voltage 91 passes through the second voltage-dividing unit 231. The value of the voltage-divided input voltage 91" may be adjusted by adjusting the resistance ratio of the resistor $R_7$ to the resistor $R_8$ according to the practical requirements.

The Zener diode $D_6$ is used for generating a second reference value $V_{ref2}$. Herein, the voltage value of the second reference value $V_{ref2}$ may be the reference value of a minimum starting voltage of the fan 10. The second comparator $U_2$ has a first input terminal $input_1$, a second input terminal $input_2$ and an output terminal "output". The first input terminal $input_1$ is a positive input terminal and receives the voltage-divided input voltage 91". The second input terminal $input_2$ is a negative input terminal and receives the second reference value $V_{ref2}$. The output terminal "output" is electrically connected to the second switch element $Q_2$ of the starting unit 21 via a resistor $R_6$, and controls the second switch element $Q_2$ to turn on or off.

The power monitoring apparatus 3 operates as follows. After the voltage monitoring unit 23 receives the input voltage 91, the second comparator $U_2$ compares the voltage-divided input voltage 91" with the second reference value $V_{ref2}$. When the voltage-divided input voltage 91" is lower than the second reference value $V_{ref2}$, the input voltage 91 is determined to be lower than the minimum starting voltage of the fan 10, and the output terminal "output" outputs a negative voltage value to turn off the first switch element $Q_1$ and the second switch element $Q_2$. The fan 10 stops rotating so that the voltage protection effect can be achieved.

On the other hand, when the voltage-divided input voltage 91" is higher than the second reference value $V_{ref2}$, the second switch element Q2 turns on, and then the first switch element $Q_1$ is triggered to turn on, and the fan 10 and the voltage detecting unit 22 start to operate. Thus, the operation voltage of the fan 10 can be detected either in normal or in abnormal condition, and the voltage protection effect for the fan 10 can be achieved. In addition, the first input terminal input, of the second comparator $U_2$ may also directly receive the input voltage 91 to perform the subsequent comparison operation, which is similar to that as described hereinabove and the description thereof will thus be omitted.

The first input terminal $input_1$ of the second comparator $U_2$ may also be a negative input terminal, and the second input terminal $input_2$ of the second comparator $U_2$ may also be a positive input terminal. Herein, the voltage value of the second reference value $V_{ref2}$ may be the reference value of a maximum acceptable voltage of the fan 10. Therefore, when the voltage-divided input voltage 91" is higher than the second reference value $V_{ref2}$, the input voltage 91 is determined to be higher than the maximum acceptable voltage of the fan 10, and the output terminal "output" outputs a negative voltage value to turn off the first switch element $Q_1$ and the second switch element $Q_2$. The fan 10 stops rotating and the voltage protection effect can be achieved. Please note that the second reference value $V_{ref2}$ may be set to be the reference value of the maximum acceptable voltage or the minimum starting voltage of the fan 10 according to the voltage value being detected.

Figure 5:
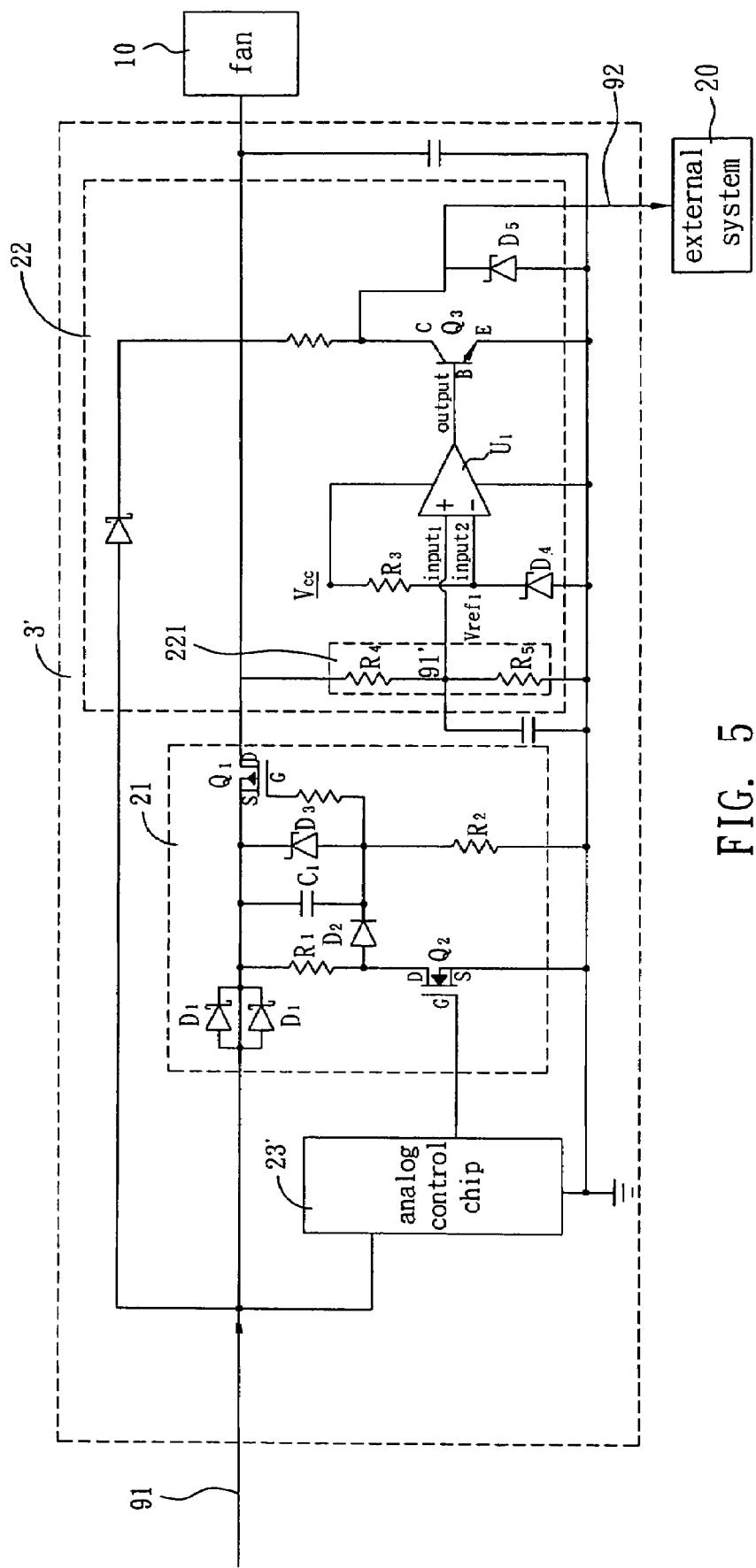
FIG. 5 is a circuit diagram showing further another power monitoring apparatus according to the preferred embodiment of the present invention.

As shown in FIG. 5, a circuit diagram showing further another power monitoring apparatus 3' according to the preferred embodiment of the present invention. The same references relate to the same elements in FIG. 4 and the description thereof will thus be omitted.

the power monitoring apparatus 3' includes a starting unit 21, a voltage detecting unit 22 and a voltage monitoring unit 23'. The difference between the power monitoring apparatus 3' of this embodiment and the power monitoring apparatus 3 in FIG. 4 is that the power monitoring apparatus 3' of this embodiment may be an analog control chip for receiving the input voltage 91. When the input voltage 91 is abnormal, the starting unit 21 is turned off and the voltage protection effect can be achieved. The reference value may be a reference voltage or a reference current.

In summary, a power monitoring apparatus of a fan according to the present invention utilizes the voltage detecting unit to detect whether the input voltage is abnormal, and output a warning signal according to the abnormal input voltage. Comparing with the prior art, the power monitoring apparatus of the present invention can highlight the abnormal input voltage of the fan for facilitating to perform repair. In addition, the power monitoring apparatus of the present invention can turn off the fan to achieve voltage protection effect when the input voltage is lower than the minimum starting voltage or is higher than the maximum acceptable voltage.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A power monitoring apparatus of a fan, for receiving an input voltage, from exterior, comprising:
    a starting unit receiving the input voltage and starting the fan according to the input voltage, wherein the starting unit comprises a first switch element and a second switch element, wherein the first switch element has a first end for receiving the input voltage and has a second end electrically connected to the fan so as to switch on the fan, the second switch element electrically connected to the first switch element for controlling the first switch element, and wherein the starting unit further comprises a capacitor having one end, a resistor having one end connected to the end of the capacitor, the other end of the capacitor electrically connected to the first switch element, and the other end of the resistor electrically connected to a ground so as to achieve a soft-start effect; and
    a voltage detecting unit electrically connected to the starting unit and generating a warning signal when the input voltage is not equal to a first reference value.

2. The power monitoring apparatus according to claim 1, wherein the starting unit further comprises at least one diode having one end for receiving the input voltage and the other end electrically connected to the first switch element.

3. The power monitoring apparatus according to claim 2, wherein the first switch element and the second switch element are transistors, respectively, the first switch element has a source electrically connected to the other end of the diode and a drain electrically connected to the fan, and the second switch element has a drain electrically connected to the other end of the diode.

4. The power monitoring apparatus according to claim 3, wherein the first switch element is a PMOS transistor, and the second switch element is an NMOS transistor.

5. The power monitoring apparatus according to claim 1, wherein the voltage detecting unit comprises:
a first comparator having a first input terminal, a second input terminal and an output terminal, the first input terminal receiving the input voltage, the second input terminal receiving the first reference value, and the output terminal outputting the warning signal when the input voltage is not equal to the first reference value.

6. The power monitoring apparatus according to claim 5, wherein the voltage detecting unit further comprises:
a first Zener diode having one end electrically connected to the second input terminal and the other end electrically connected to ground.

7. The power monitoring apparatus according to claim 5, wherein the first input terminal is a positive input terminal of the first comparator and the second input terminal is a negative input terminal of the first comparator, and the output terminal outputs the warning signal when the input voltage is lower than the first reference value.

8. The power monitoring apparatus according to claim 5, wherein the first input terminal is a negative input terminal of the first comparator and the second input terminal is a positive input terminal of the first comparator, and the output terminal outputs the warning signal when the input voltage is higher than the first reference value.

9. The power monitoring apparatus according to claim 5, wherein the voltage detecting unit further comprises:
a third switch element electrically connected to the output terminal of the first comparator, and the third switch element being turned off so as to output the warning signal when the input voltage is not equal to the first reference value.

10. The power monitoring apparatus according to claim 9, wherein the third switch element is a transistor.

11. The power monitoring apparatus according to claim 10, wherein the voltage detecting unit further comprises:
a second Zener diode having one end electrically connected to a collector of the third switch element and the other end electrically connected to ground, and one end of the second Zener diode generating the warning signal when the input voltage is not equal to the first reference value.

12. The power monitoring apparatus according to claim 1, wherein the voltage detecting unit comprises:
a voltage-dividing unit receiving the input voltage and generating a voltage-divided input voltage; and
a first comparator having a first input terminal, a second input terminal and an output terminal, the first input terminal receiving the voltage-divided input voltage, the second input terminal receiving the first reference value, and the output terminal outputting the warning signal when the voltage-divided input voltage is not equal to the first reference value.

13. The power monitoring apparatus according to claim 12, wherein the voltage-dividing unit has a first resistor and a second resistor, the first resistor has one end for receiving the input voltage and the other end electrically connected to the first input terminal, and the second resistor has one end electrically connected to the other end of the first resistor and the other end electrically connected to ground.

14. The power monitoring apparatus according to claim 1, wherein the power monitoring apparatus cooperates with an external system for receiving the warning signal and replying according to the warning signal.

15. The power monitoring apparatus according to claim 1, further comprising a voltage monitoring unit for receiving the input voltage and electrically connected to the starting unit, wherein when the input voltage is not equal to a second reference value, the voltage monitoring unit turns off the starting unit.

16. The power monitoring apparatus according to claim 15, wherein the voltage monitoring unit comprises:
a second comparator having a first input terminal, a second input terminal and an output terminal, the first input terminal receiving the input voltage, the second input terminal receiving the second reference value, and the output terminal being electrically connected to the starting unit.

17. The power monitoring apparatus according to claim 16, wherein the first input terminal is a positive input terminal of the second comparator, the second input terminal is a negative input terminal of the second comparator, and the voltage monitoring unit turns off the starting unit when the input voltage is lower than the second reference value.

18. The power monitoring apparatus according to claim 16, wherein the first input terminal is a negative input terminal of the second comparator, the second input terminal is a positive input terminal of the second comparator, and the voltage monitoring unit turns off the starting unit when the input voltage is higher than the second reference value.

19. The power monitoring apparatus according to claim 15, wherein the voltage monitoring unit comprises:
a voltage-dividing unit for receiving the input voltage and generating a voltage-divided input voltage; and
a second comparator having a first input terminal, a second input terminal and an output terminal, the first input terminal receiving the voltage-divided input voltage, the second input terminal receiving the second reference value, and the output terminal being electrically connected to the starting unit.

20. The power monitoring apparatus according to claim 15, wherein the voltage monitoring unit is an analog control chip.

* * * * *